United States Patent Office 2,718,433
Patented Sept. 20, 1955

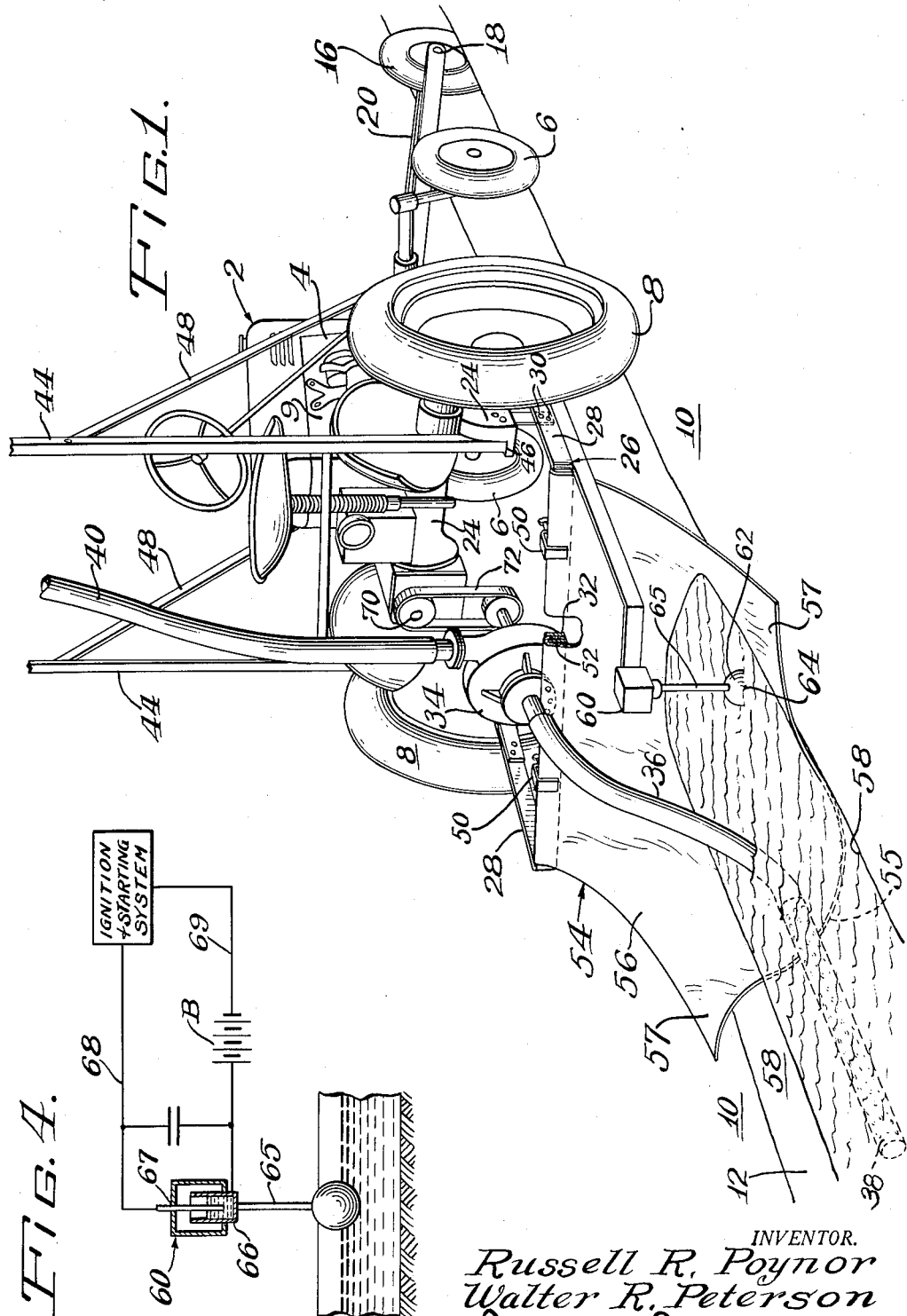

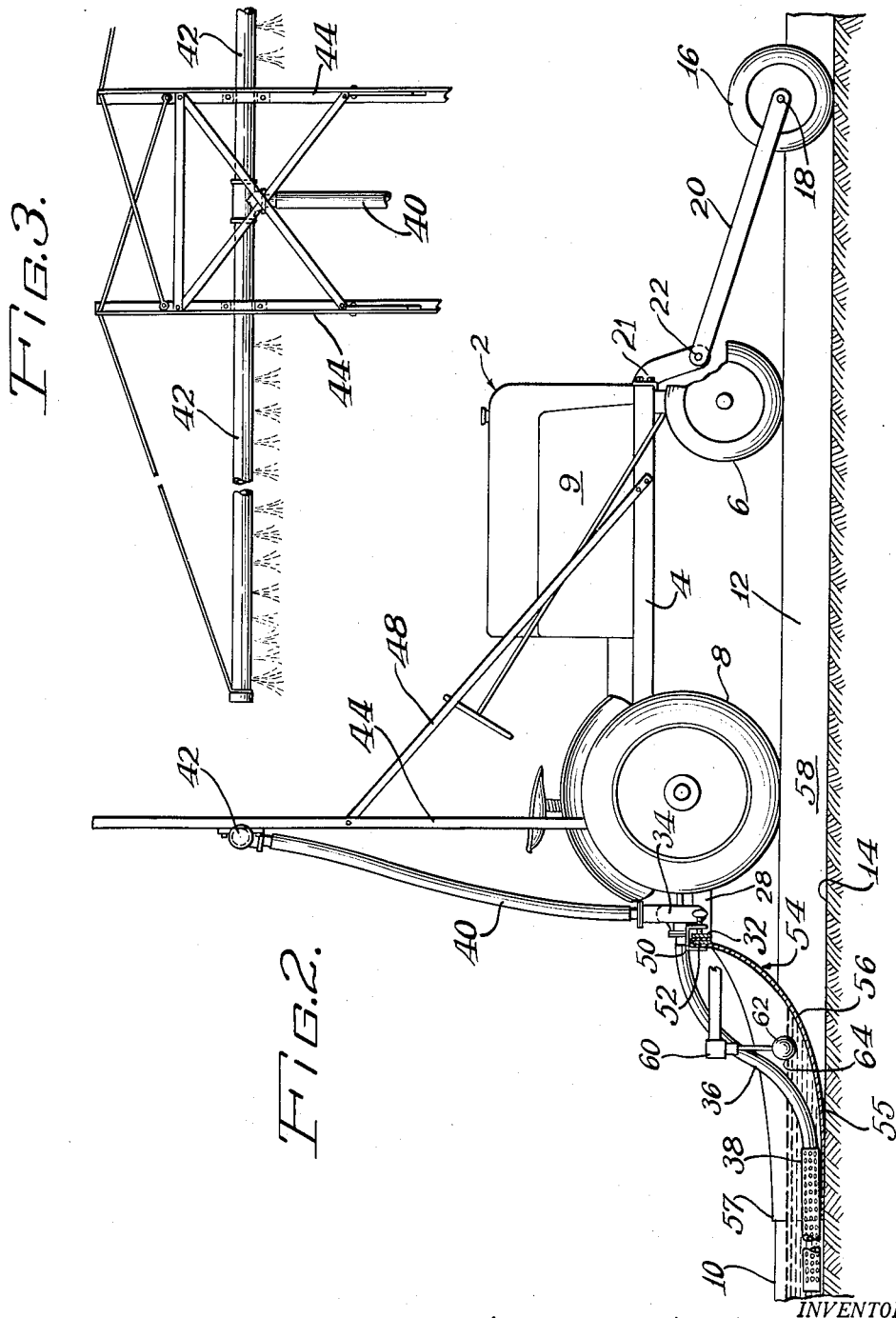

2,718,433

SELF-PROPELLED IRRIGATION APPARATUS

Russell R. Poynor, Elmhurst, and Walter R. Peterson, Plainfield, Ill., assignors to International Harvester Company, a corporation of New Jersey Application May 13, 1952, Serial No. 287,644

4 Claims. (Cl. 299—52)

This invention relates to irrigation devices and more specifically to a novel, preferably self-propelled, machine which is adapted to draw or receive water from a ditch while moving along or over the same, the machine carrying pumps whereby the water will be elevated and distributed over a wide area on either or both sides of the machine while in transit.

A general object of the invention is to provide a simple irrigation system incorporating a ditch which may be provided in the land to be irrigated, the ditch affording a course for the irrigating machine which is adapted to straddle the ditch and provided with a guidewheel thereahead which is positionable within the ditch to guide the vehicle.

A more specific object of the invention is to provide an irrigation machine comprising a tractor straddling an irrigation ditch and mounting a stationary laterally extending sprinkler boom which is connected to a pump having a suction intake adapted to be dragged within the ditch back of a dam formed of canvas or other flexible material and weighted to conform to the contour of the ditch, the dam being carried from the rear end of the tractor and the tractor having a guidewheel thereahead rotatable on a horizontal axis within the part of the ditch thereahead.

The irrigation system comprehends flooding the ditch back of the dam, and the dam being of flexible material forming a sufficient seal against the sides of the ditch so as to retain the water in back thereof thereby providing an effective seal and a deep head of water for the intake of the pump.

A still further object is to provide such a dam which will hold the water back of the guidewheel whereby the guidewheel will always travel in a substantially dry terrace so that the wheel or any other guide will not become encrusted with mud which could buildup and force the guide out of the ditch. In maintaining the furrow dry for the guidewheel, the probability of the sides of the furrow collapsing is precluded and furthermore by damming the water back of the tractor, the water is placed to efficiently feed the intake and dissipation through absorption into the soil forming the ditch is confined to the portion being utilized to conduct the water to the irrigation system.

These and other objects of the invention will become more apparent from the specification and the drawings wherein:

Figure 1 is a rear perspective view of an irrigation machine incorporating the invention and disposed over a ditch;

Figure 2 is a side perspective view of the machine;

Figure 3 is a fragmentary front view of the sprinkler boom; and

Figure 4 is a diagrammatic illustration of the starting and ignition arrangement.

Describing the invention in detail, the tractor generally designated 2 comprises a chassis 4 mounted on four wheels, the front wheels 6 normally being free to turn and the rear wheels 8 are power driven from the source of power 9, which is the tractor engine. The tractor is preferably geared to travel at very low speed preferably about six feet per minute. The four wheels 6 and 8 are intended to rest upon the banks 10 at each side of a ditch 12, the bottom of which is indicated at 14. The vehicle straddles the ditch 12 and follows the meanderings of the ditch by means of a guidewheel 16 which is mounted on a substantially horizontal axis by means of a cross-shaft 18 to the lower forward end of a forwardly downwardly inclined bar or standard 20 which is adjustably pivotally connected as at 22 to the front end of the chassis 4, by a bracket 21. It will be seen that the guidewheel 16 is disposed below the level of the wheels 6 and 8 and adapted to ride along the bottom 14 of the ditch 12 and with its sides to engage with the sides of the ditch to control the movement of the vehicle along the ditch in straddling relationship thereto. The guide may be pivoted upwardly and locked in transport position when the unit is to be moved to another location.

The tractor may include a rear axle housing 24 which may form the rear end of the chassis or frame 4 to which may be secured in usual manner a U-shaped drawbar 26 having side arm 28 at opposite ends secured as at 30 to the housing 24 in usual manner. The rear extents of the arms 28, 28 may be interconnected by a crossbar 32 extending transversely of the tractor and of a length preferably greater than the width of the ditch. The drawbar 26 may mount a conventional centrifugal pump 34 which may have a flexible intake hose 36 with a screened intake shoe 38 adapted to be positioned within the ditch 12 as the vehicle progresses along the ditch. The pump may be provided with a flexible conduit 40 extending upwardly and connected at its upper end to laterally extending arms 42, 42 in the form of perforated tubes so that the water may be discharged therethrough on the land at opposite sides of the ditch. The arms 42, 42 are supported from upstanding standards or booms 44, 44 which are suitably secured as at 46 to the rear axle housing 24 and by bracings 48 to other portions of the chassis. The arms 42, 42 are sprinklers, however, it will be understood that the term "sprinkler" is to include any outlet to discharge the water and not necessarily a spray.

The crossbar 32 of the drawbar is connected as by removable U-clamps 50, 50 to a rigid bar or mounting member 52 of a dam 54 which is formed of flexible water-retentive material, such as canvas 56, which forms a flap which fits into the ditch with its intermediate portion 55 along the sides 58, 58 and the bottom 14 of the ditch, the flap having its lateral extremities 57, 57 extended over the banks. It will be seen that the mounting bar of the dam and the flap are longer than the width of the ditch. The flap 56 may have the plurality of weights secured thereto, if desired, or it may, of itself, be sufficiently heavy to fall into close conformity with the sides and the bottom of the ditch thereby providing a sufficiently effective seal to prevent any substantial amounts of water from seeping past.

In operation the water is pumped into the ditch back of the dam so that a high head of water is provided at the intake to the pump and the ditch ahead of the dam is maintained substantially dry. The intake 38 is a long perforated extension of the hose trailing behind the dam preferably about ten feet.

To insure that the tractor will not merely run along the ditch without there being sufficient water back of the dam to obtain the desired irrigation, the tractor is provided with an automatic control in the form of a switch, generally designated 60, the switch being carried by the drawbar and including a float 62 adapted to ride upon the water back of the dam and as indicated at 64, the float being connected to a stem 65 for operating the switch and the switch being connected to the starting and ignition systems as shown diagrammatically in Figure 3. The switch may have one terminal 66 preferably a vertically movable cup with mercury which is connected to the battery B. The cup 66 in upper contact position, may establish a circuit to the stationary terminal 67 of an ignition lead 68, the ignition being connected through lead 69 to battery B. The starting system may employ a conventional starter and the starter is adapted to turn the engine while the tractor is in gear. The starter may be disconnected from the circuit by a conventional vacuum switch operated from the engine exhaust manifold or the starter may be governor controlled as will be apparent to those skilled in the art. It will be apparent that as long as the water level back of the dam is at a predetermined height, the float will maintain the switch on, or closed whereby the tractor will continue to proceed along the ditch. If the level of the water is below a predetermined height the float will drop and turn off or open the switch which will stop the tractor until the water level builds up whereupon the float rises and turns the starter and ignition systems on so that the tractor again proceeds down the field. The pump may be driven from the power take-off 70 of the tractor through a belt and pulley drive 72. It will be understood that the irrigation machine is automatic in operation without an operator.

We claim:

1. In an irrigating machine to straddle a water supply ditch having opposite banks, a wheeled vehicle having forward and rear wheels riding upon said banks, guide means connected to the vehicle and extending thereahead into the ditch to engage with the surfaces of the ditch to guide the vehicle to follow the direction of the ditch and comprising standard having an operative pivotal connection at one end to said vehicle on a generally horizontal axis and a vertical guide wheel journalled on a generally horizontal axis to the other end of the standard and adapted to ride in said ditch, a pump mounted on the vehicle, a source of power on the vehicle connected to the pump, a support structure carried by the vehicle, sprinkler arms supported from the support structure, conduit means for conveying water from the ditch to the pump and from the pump to the arms, a drawbar carried by the vehicle and extending rearwardly of the rear wheels, a dam carried from the rear end of said drawbar and comprising a flexible flap depending from the drawbar into the ditch in close conformance to the contour thereof, and adapted to hold the water in the ditch back of the rear wheels and said guide means whereby the guide means and the portion of the ditch ahead of the flap are maintained relatively dry, said conduit means extending into the water in the ditch immediately back of said flap and having an intake element extending a substantial distance rearwardly of said flap, said standard being disposed entirely forwardly of said vehicle and adapted to be folded upwardly to inoperative transport position about the pivotal connection to said vehicle above the level of said front and rear vehicle wheels.

2. In an irrigation machine to straddle a water supply ditch, a tractor including a conventional power source and pairs of supporting spaced front and rear wheels riding upon the banks of the ditch, sprinkler means carried by the tractor and formed and arranged to draw water from the ditch and sprinkle the same over the adjacent land, and means for starting and stopping the tractor respectively when the water level within the ditch rises above or falls below a predetermined level.

3. A machine according to claim 2 and said means comprising a switch carried by the tractor and including a float adapted to ride upon the water in the ditch for opening the switch when the water level falls below a predetermined height and closing the switch when the level is above said height, and means operatively connecting said switch with the ignition system of the tractor.

4. In an irrigation machine to straddle a water supply ditch, a tractor including a conventional power source and pairs of supporting spaced front and rear wheels riding upon the banks of the ditch, sprinkler means carried by the tractor and formed and arranged to draw water from the ditch and sprinkle the same over the adjacent land, and means for starting and stopping the tractor respectively when the water level within the ditch rises above or falls below a predetermined level, and said means comprising a switch carried by the tractor and including a float adapted to ride upon the water in the ditch for opening the switch when the water level falls below a predetermined height and closing the switch when the level is above said height, and means operatively connecting said switch with the ignition system of the tractor, and a support for said switch connected to said tractor and extending rearwardly of said rear wheels and said float depending from said support and adapted to be lowered into said ditch upon the front end of said tractor rising when ascending a grade.

References Cited in the file of this patent
UNITED STATES PATENTS

| | | |
|---|---|---|
| 1,902,412 | Melin | Mar. 21, 1933 |
| 2,574,634 | Frampton | Nov. 13, 1951 |
| 2,628,863 | Maggart | Feb. 17, 1953 |